(12) United States Patent
Itankar et al.

(10) Patent No.: US 12,451,718 B2
(45) Date of Patent: Oct. 21, 2025

(54) WEARABLE COMPUTING DEVICE HAVING A CHARGING SYSTEM FOR A RECHARGEABLE BATTERY

(71) Applicant: Google LLC, Mountain View, CA (US)

(72) Inventors: Piyush Tulsidas Itankar, Bangalore (IN); Shantanu Goel, Bangalore (IN); Dheeraj Kumar Agrawal, Jaipur (IN); Mahmad Saifuddin Bharmal, Rajkot (IN)

(73) Assignee: GOOGLE LLC, Mountain View, CA (US)

( * ) Notice: Subject to any disclaimer, the term of this patent is extended or adjusted under 35 U.S.C. 154(b) by 814 days.

(21) Appl. No.: 17/557,823

(22) Filed: Dec. 21, 2021

(65) Prior Publication Data

US 2023/0198284 A1 Jun. 22, 2023

(51) Int. Cl.
*H02J 7/14* (2006.01)
*G06F 1/16* (2006.01)
*G06F 3/0488* (2022.01)
*H02J 7/34* (2006.01)

(52) U.S. Cl.
CPC ............... *H02J 7/14* (2013.01); *G06F 1/163* (2013.01); *H02J 7/345* (2013.01); *G06F 3/0488* (2013.01)

(58) Field of Classification Search
CPC ...................................................... G04C 10/00
See application file for complete search history.

(56) References Cited

U.S. PATENT DOCUMENTS

| | | | |
|---|---|---|---|
| 3,169,218 A * | 2/1965 | Reich ..................... | G04C 11/02 968/510 |
| 4,939,707 A | 7/1990 | Nagao | |
| 5,278,806 A * | 1/1994 | Affolter ................. | G04C 10/00 368/64 |

(Continued)

FOREIGN PATENT DOCUMENTS

WO        WO 8401041        * 3/1984

OTHER PUBLICATIONS

Knapen, WO 8401041 translation, Portable Mini AC Generator, 1984.*

(Continued)

*Primary Examiner* — Tynese V McDaniel
(74) *Attorney, Agent, or Firm* — DORITY & MANNING P.A.

(57) ABSTRACT

A wearable computing device is provided. The wearable computing device includes a housing and a rechargeable battery disposed within a cavity defined by the housing. The wearable computing device further includes a charging system disposed within the cavity. The charging system includes an alternating current (AC) generator configured to generate alternating current power. The charging system includes a rectifier circuit electrically coupled to a stator of the AC generator. The rectifier circuit is configured to convert AC power to direct current (DC) power. The charging system includes an energy storage device electrically coupled to the rectifier circuit such that the energy storage device is charged with the DC power. The charging system includes a solid state switch configured to selectively couple the energy storage device to the rechargeable battery to transfer charge from the energy storage device to the rechargeable battery.

19 Claims, 8 Drawing Sheets

(56) References Cited

U.S. PATENT DOCUMENTS

| | | | | |
|---|---|---|---|---|
| 6,081,095 | A * | 6/2000 | Tamura | B60L 58/22 |
| | | | | 903/907 |
| 2002/0113513 | A1 * | 8/2002 | Yun | H02K 21/16 |
| | | | | 310/156.38 |
| 2003/0102754 | A1 * | 6/2003 | Yun | H02K 1/2753 |
| | | | | 310/156.38 |
| 2005/0162033 | A1 * | 7/2005 | Yun | H02K 53/00 |
| | | | | 310/216.112 |
| 2011/0084488 | A1 * | 4/2011 | Eder | F03B 13/186 |
| | | | | 290/53 |
| 2013/0147425 | A1 * | 6/2013 | Chang | H02J 7/32 |
| | | | | 320/108 |
| 2015/0309536 | A1 * | 10/2015 | Dickinson | G06F 1/163 |
| | | | | 345/173 |
| 2016/0170377 | A1 | 6/2016 | Hamatani et al. | |
| 2017/0155276 | A1 * | 6/2017 | Harada | H02J 7/0068 |
| 2018/0337551 | A1 * | 11/2018 | Park | H02N 2/181 |
| 2019/0087012 | A1 * | 3/2019 | Miller | G06F 3/0418 |
| 2020/0006965 | A1 * | 1/2020 | Edelhäuser | H02M 1/32 |
| 2020/0059168 | A1 * | 2/2020 | Ward | H02N 1/004 |
| 2020/0244127 | A1 * | 7/2020 | Birkmayer | H02K 11/20 |
| 2022/0026779 | A1 * | 1/2022 | Zheng | G02B 6/356 |
| 2023/0048694 | A1 * | 2/2023 | Jumayev | H02K 7/061 |
| 2023/0083009 | A1 * | 3/2023 | Hamada | H01M 10/44 |
| | | | | 320/116 |
| 2023/0187935 | A1 * | 6/2023 | Jha | H02P 9/02 |
| | | | | 290/44 |
| 2023/0198284 | A1 * | 6/2023 | Itankar | H02J 7/0042 |
| | | | | 320/114 |

OTHER PUBLICATIONS

Olivo, "A Kinetic Energy Harvester with Fast Start-up for Wearable Body-Monitoring Sensors", 2010 4$^{th}$ International Conference on Pervasive Computing Technologies for Healthcare, Mar. 22-25, Munich, Germany, 7 pages.

Doensen, "M. Automatic Quartz Watch", https://web.archive.org/web/20140110103911/https://doensen.home.xs4all.nl/m.html, retrieved on Dec. 20, 2024, 4 pages.

* cited by examiner

WEARABLE COMPUTING DEVICE HAVING A CHARGING SYSTEM FOR A RECHARGEABLE BATTERY

FIELD

The present disclosure relates generally to wearable computing devices. More particularly, the present disclosure relates to a charging system for a rechargeable battery of a wearable computing device.

BACKGROUND

A wearable computing device (e.g., wrist watches) can gather data regarding activities performed by the user, or regarding the user's physiological state. Such data may include data representative of the ambient environment around the user or the user's interaction with the environment. For example, the data can include motion data regarding the user's movements and/or physiological data obtained by measuring various physiological characteristics of the user, such as heart rate, perspiration levels, and the like.

The wearable computing device can include a rechargeable battery that provides direct current power to electronic components thereof. For instance, the rechargeable battery can be disposed within a housing of the wearable computing device. Furthermore, the wearable computing device can include one or more charging pins to facilitate coupling the rechargeable battery to an external power source (e.g., wall outlet) via a charging cable. In this manner, the rechargeable battery can be charged.

SUMMARY

Aspects and advantages of embodiments of the present disclosure will be set forth in part in the following description, or can be learned from the description, or can be learned through practice of the embodiments.

In one aspect, a wearable computing device is provided. The wearable computing device includes a housing and a rechargeable battery disposed within a cavity defined by the housing. The wearable computing device further includes a charging system disposed within the cavity. The charging system includes an alternating current generator configured to generate alternating current power. The alternating current generator includes a stator and a rotor. The stator includes a plurality of poles. The rotor is rotatable relative to the stator due to motion of a user wearing the wearable computing device. The charging system includes a rectifier circuit electrically coupled to a stator of the alternating current generator. The rectifier circuit is configured to convert the alternating current power to direct current power. The charging system includes an energy storage device electrically coupled to the rectifier circuit such that the energy storage device is charged with the direct current power. The charging system includes a solid state switch configured to selectively couple the energy storage device to the rechargeable battery to transfer charge from the energy storage device to the rechargeable battery.

In another aspect, a method of charging a rechargeable battery of a wearable computing device is provided. The method includes generating, via an alternating current generator of a charging system of the wearable computing device, alternating current power from motion of the wearable computing device. The method includes converting, via a rectifier circuit of the charging system, the alternating current power to direct current power. The method includes charging an energy storage device of the charging system with the direct current power. The method includes transferring charge from the energy storage device to the rechargeable battery.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
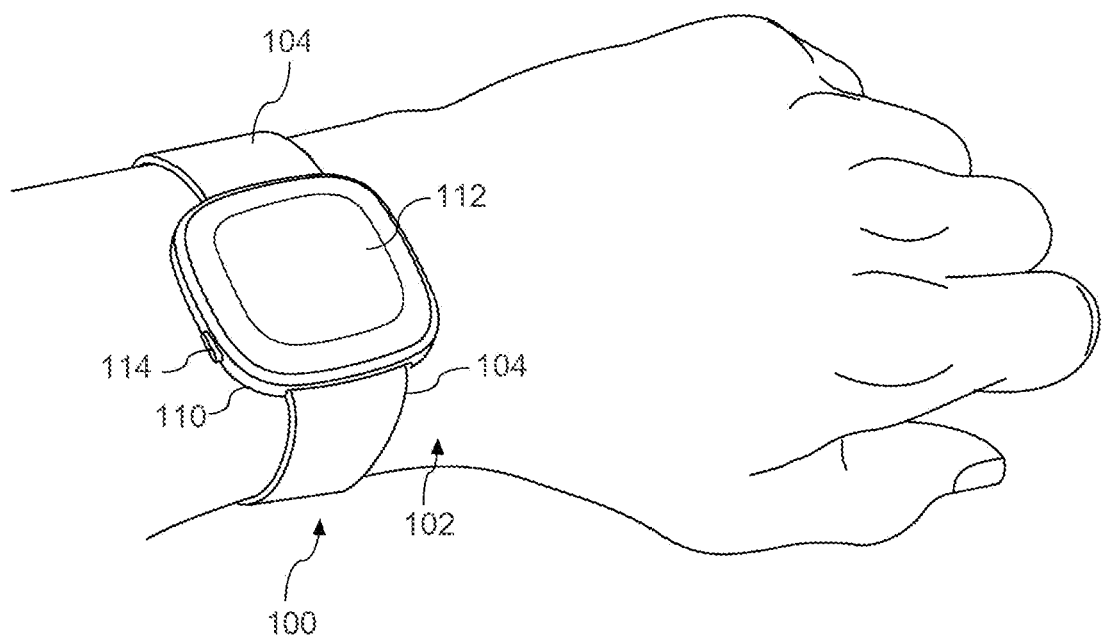
FIG. 1 depicts a wearable computing device according to some implementations of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a wearable computing device that can be worn, for instance, on a user's wrist. The wearable computing device can include a rechargeable battery (e.g., lithium ion battery) disposed within a housing of the wearable computing device. The rechargeable battery can deliver direct current (DC) power to electronic components (e.g., processors) of the wearable computing device. However, since the rechargeable battery is disposed within the housing of the wearable computing device, the form factor (e.g., size) of the rechargeable battery is limited. Furthermore, since the power density of the rechargeable battery is a function of the size of the rechargeable battery, the power density of the rechargeable battery is limited as well. As such, the wearable computing device must be connected to an external power source (e.g., alternating current wall outlet) to charge the rechargeable battery. However, since the power density of the rechargeable battery is limited, the rechargeable battery cannot be rapidly charged via the external power source.

A wearable computing device according to the present disclosure can include a charging system positioned within a housing of the wearable computing device. The charging system can include an alternating current generator. The alternating current generator can include a stator having a plurality of poles. In some implementations, the stator can include an even number of poles. For instance, in some implementations, the stator can include a total of twelve separate poles. In alternative implementations, the stator can include an odd number of poles. For instance, in some implementations, the stator can include eleven poles. The stator can further include a coil associated with each pole of the plurality of poles. In some implementations, the coil can include a copper winding or other suitable conductor winding.

The alternating current generator can include a rotor. For instance, the rotor can include a magnet that rotates relative to the plurality of poles due to motion of the wearable computing device caused by the user. For instance, the magnet can rotate when the user is engaging in an activity (e.g., running, walking, etc.) that causes the wearable computing device to move. In some implementations, the magnet can be coupled to an arm that is rotatable about a pivot point. For instance, the magnet can be coupled to an end of the arm that is distal to the pivot point. In some implementations, the pivot point can correspond to a center of the housing of the wearable computing device. It should be understood that the arm can rotate due to motion of the user wearing the wearable computing device.

As the magnet moves, a magnetic flux changes between the magnet and one or more of the plurality of poles of the stator. This change in the magnetic flux can induce a voltage on the coil associated with a corresponding pole of the one or more poles. For instance, rotation of the magnet can cause a change (e.g., decrease) in a first magnetic flux between the magnet and a first pole of the plurality of poles that induces a first impulse voltage on a first coil associated with the first pole. Additionally, rotation of the magnet can cause a change (e.g., increase) in a second magnetic flux between the magnet and a second pole of the plurality of poles that induces a second impulse voltage on a second coil associated with the second pole of the plurality of poles. It should be understood that inducement of these separate impulse voltages can be operable to provide alternating current power.

The charging system can include a rectifier circuit electrically coupled to the coil associated with a corresponding pole of the plurality of poles. In this manner, the rectifier circuit can obtain the alternating current power generated by the alternating current generator. The rectifier circuit can convert the alternating current power into direct current power. In some implementations, the rectifier circuit can include a half-wave rectifier. In alternative implementations, the rectifier circuit can include a full-wave rectifier.

The charging system can include an energy storage device electrically coupled to the rectifier circuit. In this manner, the energy storage device can be charged with at least a portion of the direct current power output by the rectifier circuit. The energy storage device can have a power density that is greater than a power density of the rechargeable battery. In this manner, the energy storage device can accommodate storage of the bursts of energy (e.g., impulse voltages) output by the alternating current generator due to motion of the wearable computing device. For instance, in some implementations, the energy storage device can include a supercapacitor.

The charging system can include a solid state switch configured to selectively couple the energy storage device to the rechargeable battery of the wearable computing device. For instance, the solid state switch can be configurable in a first state in which the energy storage device is coupled to the rechargeable battery via the solid state switch and a second state in which the energy storage device is decoupled from the rechargeable battery via the solid state switch. In this manner, the energy storage device can be coupled to the rechargeable battery via the solid state switch to facilitate charging the rechargeable battery.

In some implementations, the solid state switch can be configured in the first state when a voltage associated with the energy storage device is less than threshold voltage. In this manner, charge cannot be transferred from the energy storage device to the rechargeable battery when the voltage associated with the energy storage device is less than the threshold voltage. Conversely, the solid state switch can be configured in the second state when the voltage associated with the energy storage device is greater than the threshold voltage. In this manner, charge can be transferred from the energy storage device to the rechargeable battery when the voltage associated with the energy storage device is greater than the threshold voltage. In some implementations, the threshold voltage can correspond to a rated voltage associated with the rechargeable battery. For instance, in some implementations, the rated voltage can range from about 1.2 Volts to about 3 Volts. As used herein, use of the term "about" in conjunction with a numerical value refers to a range of values within ten-percent of the stated numerical value.

In some implementations, the charging system can include a current protection circuit coupled between the rechargeable battery and the solid state switch. The current protection circuit can be configured to regulate a current associated with the charge being transferred from the energy storage device to the rechargeable battery. In this manner, the rechargeable battery can be protected against an overcurrent condition that may occur when transferring charge from the energy storage device to the rechargeable battery.

A wearable computing device according to example aspects of the present disclosure can provide numerous technical effects and benefits. For instance, the charging system can eliminate the need for the wearable computing device to be connected to an external power source via a charging cable. Furthermore, since the wearable computing device according to example aspects of the present disclosure does not need to be connected to the external power source via the charging cable, the size of the rechargeable battery onboard the wearable computing device can be reduced.

Figure 2:
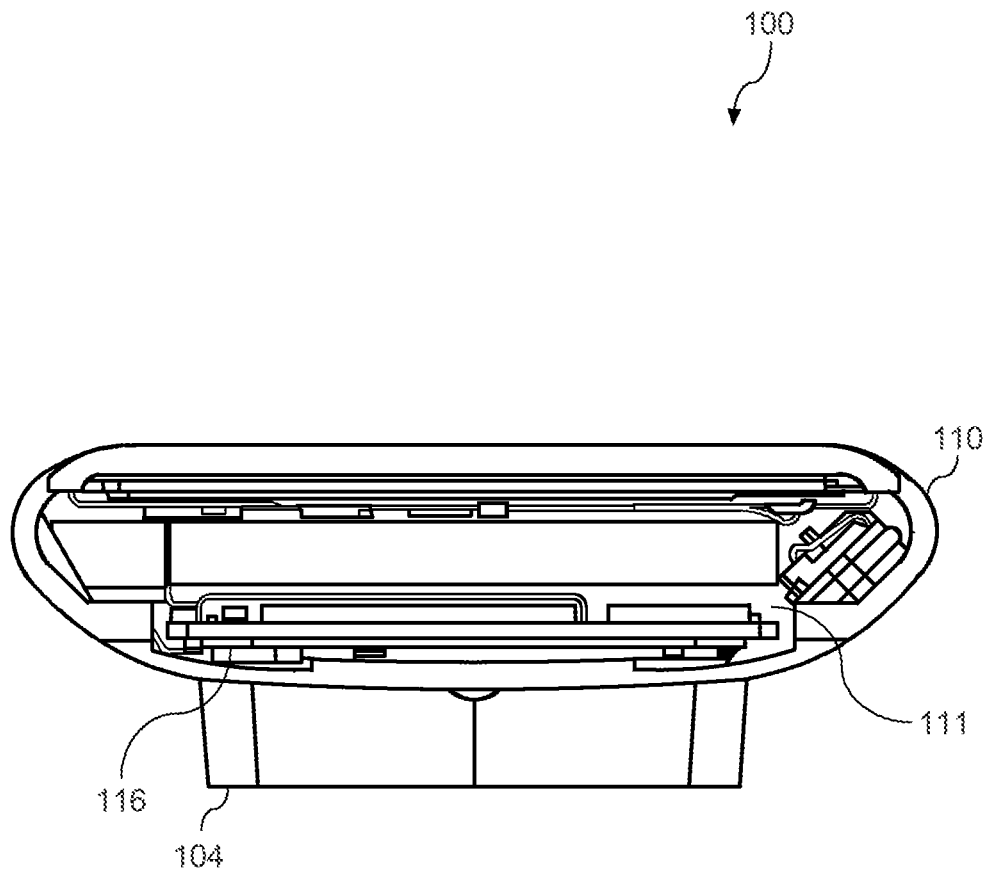
FIG. 2 depicts a cross-sectional view of a wearable computing device according to some implementations of the present disclosure.
Figure 3:
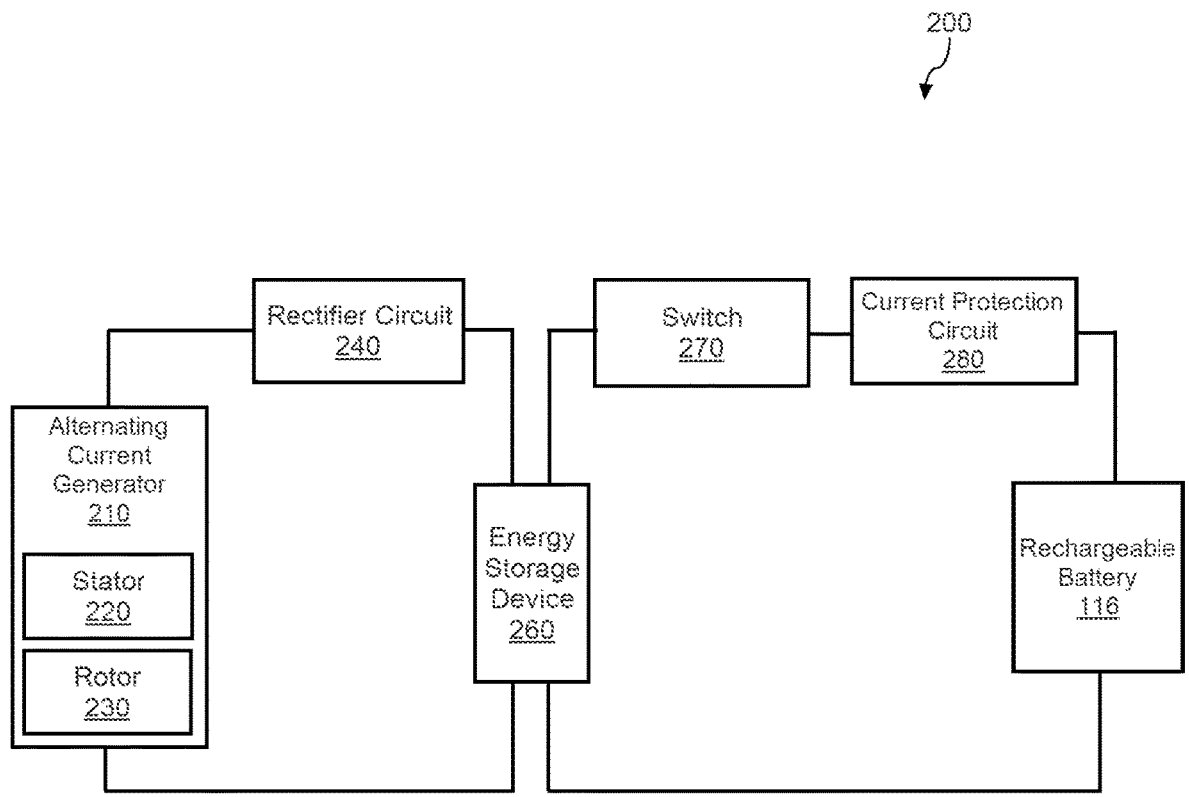
FIG. 3 depicts a block diagram of components of a charging system for a wearable computing device.
Figure 4:
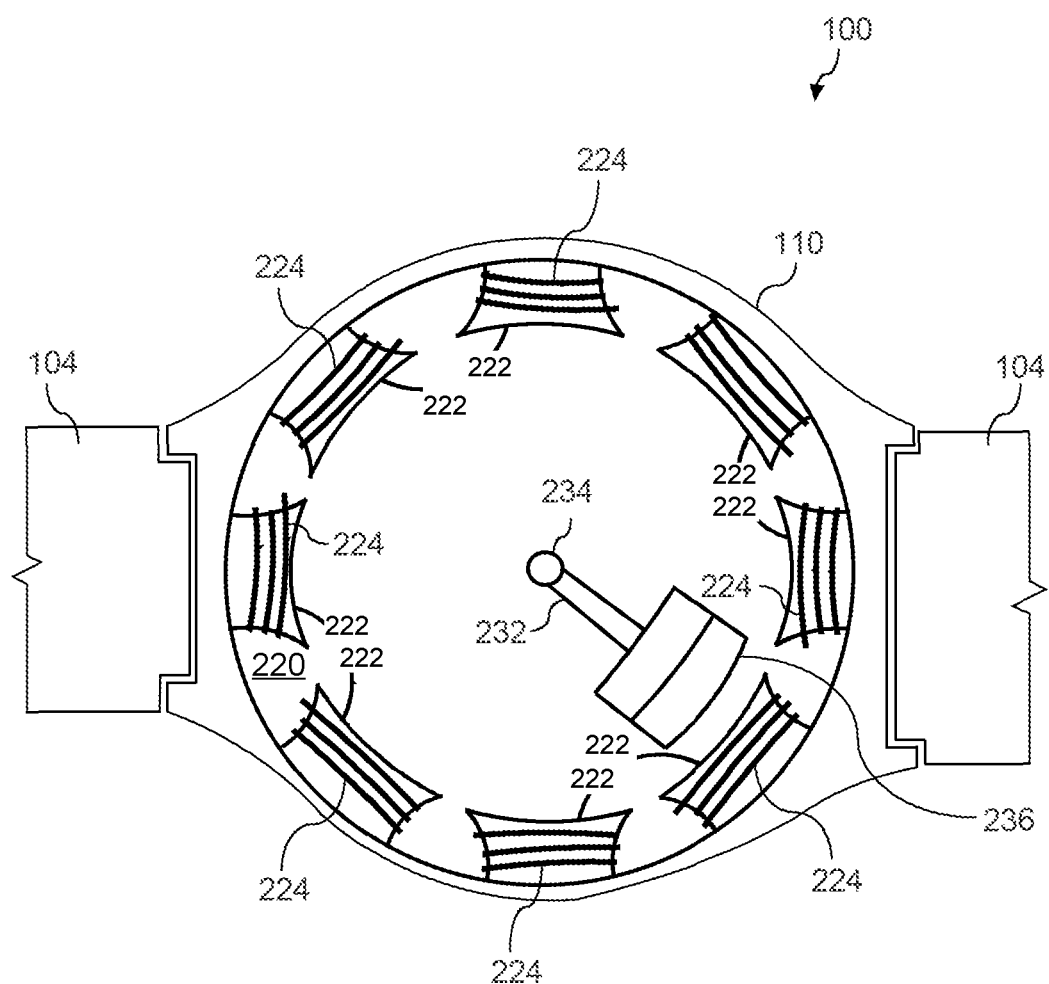
FIG. 4 depicts a top view of an alternating current generator of a charging system disposed within a housing of a wearable computing device according to some implementations of the present disclosure.
Figure 5:
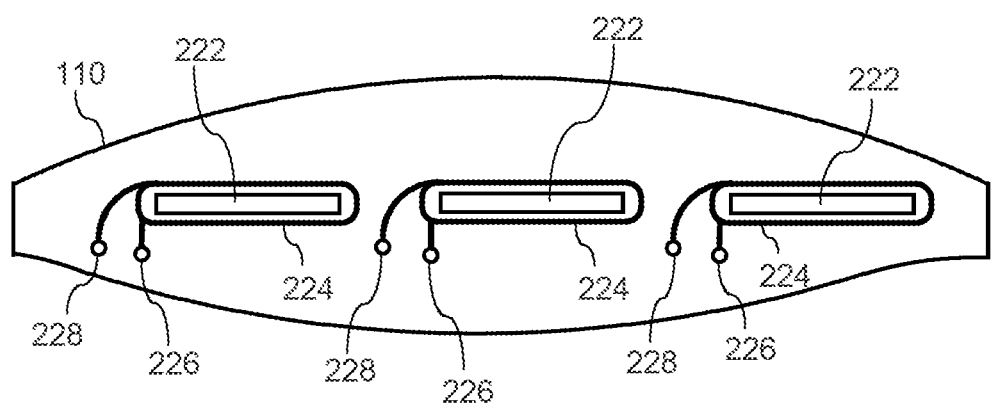
FIG. 5 depicts a side view of an alternating current generator of a charging system disposed within a housing of a wearable computing device according to some implementations of the present disclosure.
Figure 6:
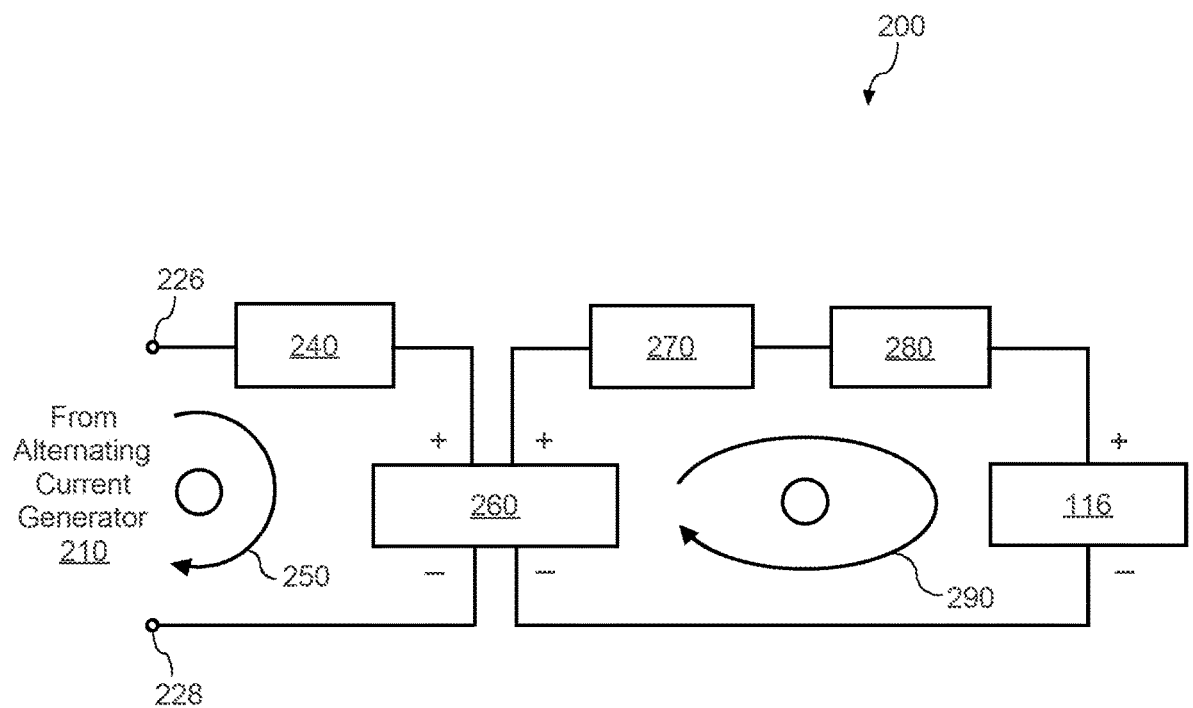
FIG. 6 depicts a circuit diagram of a charging system for a rechargeable battery of a wearable computing device according to some implementations of the present disclosure.

Referring now to the FIGS., FIGS. 1 and 2 depict a wearable computing device 100 according to some implementations of the present disclosure. As shown, the wearable computing device 100 can be worn, for instance, on an arm 102 (e.g., wrist) of a user. For instance, the wearable computing device 100 can include a band 104 and a housing 110. In some implementations, the housing 110 can include a conductive material (e.g., metal). In alternative implementations, the housing 110 can include a non-conductive material (e.g., a plastic material, a ceramic material).

The housing 110 can be coupled to the band 104. In this manner, the band 104 can be fastened to the arm 102 of the user to secure the housing 110 to the arm 102 of the user. Furthermore, the housing 110 can define a cavity 111 for one or more electronic components (e.g., disposed on printed circuit boards) of the wearable computing device.

In some implementations, the wearable computing device 100 can include a display screen 112. The display screen 112 can display content (e.g., time, date, biometrics, etc.) for viewing by the user. In some implementations, the display screen 112 can include an interactive display screen (e.g., touchscreen or touch-free screen). In such implementations, the user can interact with the wearable computing device 100 via the display screen 112 to control operation of the wearable computing device 100.

In some implementations, the wearable computing device 100 can include one or more input devices 114 that can be manipulated (e.g., pressed) by the user to interact with the wearable computing device 100. For instance, the one or more input devices 114 can include a mechanical button that can be manipulated (e.g., pressed) to interact with the wearable computing device 100. In some implementations, the one or more input devices 114 can be manipulated to control operation of a backlight (not shown) associated with the display screen 112. It should be understood that the one or more input device 114 can be configured to allow the user to interact with the wearable computing device 100 in any suitable manner. For instance, in some implementations, the one or more input devices 114 can be manipulated by the user to navigate through content (e.g., one or more menu screens) displayed on the display screen 112.

The wearable computing device 100 can include a rechargeable battery 116 positioned within the cavity 111 defined by the housing 110. The rechargeable battery 116 can provide direct current power to the one or more electronics of the wearable computing device 100. In some implementations, the rechargeable battery 116 can include a lithium ion battery. It should be understood, however, that the rechargeable battery 116 can include any suitable type of rechargeable battery. Furthermore, it should be understood that the rechargeable battery can have any suitable rated voltage. For instance, in some implementations, the rated voltage of the rechargeable battery 116 can range from about 1.2 Volts to about 3 Volts.

Referring now to FIGS. 3-6, a charging system 200 for the rechargeable battery 116 of the wearable computing device 100 is provided according to some implementations of the present disclosure. It should be understood that the charging system 200 is disposed within the cavity 111 (FIG. 2) defined by the housing 110 of the wearable computing device 100 (FIG. 2). Details of the charging system 200 will now be discussed.

As shown, the charging system 200 can include an alternating current generator 210. The alternating current generator 210) can include a stator 220 having a plurality of poles 222. In some implementations, the plurality of poles 222 can be arranged in an annular (e.g., ring shaped) pattern within the housing 110 of the wearable computing device 100 (FIG. 2). It should be understood that the stator 220 can include any suitable number of poles 222. For instance, in some implementations, the stator 220) can include an even number of poles 222 (e.g., twelve). In alternative implementations, the stator can include an odd number of poles 222 (e.g., eleven).

The stator 220 can further include a plurality of coils 224. As shown, each of the coils 224 can be associated with a corresponding pole of the plurality of poles 222. Furthermore, each of the coils 224 can wrap around the corresponding pole of the plurality of poles 222. Each of the coils 224 can include a first terminal 226 and a second terminal 228. In some implementations, one or more of the coils 224 can include a copper winding. It should be understood, however, that the coils 224 can include any suitable conductive material.

The alternating current generator 210 can include a rotor 230. For instance, the rotor 230 can rotate relative to the plurality of poles 222 of the stator 220 due to motion of a user wearing the wearable computing device 100. For instance, the magnet can rotate when the user is engaging in an activity (e.g., running, walking, etc.) that causes the wearable computing device 100 to move and thus causes the rotor 230 to rotate relative to the plurality of poles 222 of the stator 220.

In some implementations, the rotor 230 can include an arm 232 that is configured to rotate about a pivot point 234. In some implementations, the pivot point 234 can correspond to a center of the housing 110 of the wearable computing device 100. In this manner, the arm 232 can rotate about the center of the housing 110. The rotor 230 can further include a magnet 236 that is coupled to an end of the arm 232 that is distal to the pivot point 234. In this manner, the magnet 236 can rotate relative to the plurality of poles 222 of the stator 220) as the arm 232 of the rotor 230 rotates about the pivot point 234 due to motion of the user wearing the wearable computing device 100.

As the magnet 236 rotates, a magnetic flux changes between the magnet 236 and one or more of the plurality of poles 222 of the stator 220. This change in the magnetic flux can induce an impulse voltage. For instance, rotation of the magnet 236 can cause a change (e.g., decrease) in a first magnetic flux between the magnet 236 and a first pole of the plurality of poles 222 that induces a first impulse voltage on a first coil of the plurality of coils 224 that wraps around the first coil. Additionally, rotation of the magnet 236 can cause a change (e.g., increase) in a second magnetic flux between the magnet 236 and a second pole of the plurality of poles that induces a second impulse voltage on a second coil of the plurality of coils 224 that wraps around the second pole. It should be understood that these separate impulse voltages can be collectively referred to as alternating current power.

The charging system 200 can include a rectifier circuit 240 electrically coupled to the stator 220 of the alternating current generator 210. For instance, the rectifier circuit 240) can be electrically coupled to each of the plurality of coils 224 of the stator 220. More particularly, the rectifier circuit 240 can be coupled between the first terminal 226 of a corresponding coil 224 and the second terminal 228 of the corresponding coil. In this manner, an alternating current 250 associated with the alternating current voltage impulse induced on the corresponding coil due to motion of the user wearing the wearable computing device 100 can be provided to the rectifier circuit 240).

It should be understood that the rectifier circuit 240 is configured to convert the alternating current power (that is, the plurality of impulse voltages) to direct current power. In some implementations, the rectifier circuit 240) can include a half-wave rectifier. It should be understood, however, that the rectifier circuit 240 can include any suitable type of rectifier. For instance, in some implementations, the rectifier circuit 240 can include a full-wave rectifier.

The charging system 200 can include an energy storage device 260 electrically coupled to the rectifier circuit 240. More particularly, the energy storage device 260 can be electrically coupled to an output of the rectifier circuit 240 such that the energy storage device 260 is charged with the direct current power output by the rectifier circuit 240. The energy storage device 260 can have a power density that is greater than a power density of the rechargeable battery 116. In this manner, the energy storage device 260 can accommodate storage of the bursts of energy (e.g., impulse voltages) output by the alternating current generator 210 due to motion of the user wearing the wearable computing device 100. For instance, in some implementations, the energy storage device 260 can be a supercapacitor.

In some implementations, the rectifier circuit 240 can be electrically coupled to each of the plurality of coils 224 such that current flow is unidirectional. More specifically, the rectifier circuit 240 can be electrically coupled to each of the coils 224 so that current (e.g., alternating current 250)) flows from the coils 224 to the rectifier circuit 240. In this manner, the energy storage device 260 cannot transfer charge to the alternating current generator 210. More specifically, direct current associated with charge stored in the energy storage device 260 cannot flow from the energy storage device 260 to the coils 224 of the stator 220 of the alternating current generator 210.

The charging system 200 can include a solid state switch 270 configured to selectively couple the energy storage device 260 to the rechargeable battery 116 of the wearable computing device 100. For instance, the solid state switch 270 can be configurable in a first state in which the energy storage device 260 is coupled to the rechargeable battery via the solid state switch 270 and a second state in which the energy storage device 260 is decoupled from rechargeable battery 116 via the solid state switch 270. In this manner, the energy storage device 260 can be electrically coupled to the rechargeable battery 116 via the solid state switch 270 to facilitate charging the rechargeable battery 116.

In some implementations, the solid state switch 270 can be configured in the first state when a voltage associated with the energy storage device 260 is less than threshold voltage. In this manner, charge cannot be transferred from the energy storage device 260 to the rechargeable battery 116 when the voltage associated with the energy storage device 260 is less than the threshold voltage. For instance, a direct current 290 can flow from the energy storage device 260 to the rechargeable battery 116 via the solid state switch 270 configured in the first state. Conversely, the solid state switch 270 can be configured in the second state when the voltage associated with the energy storage device 260 is greater than the threshold voltage. In this manner, charge can be transferred from the energy storage device 260 to the rechargeable battery 116 when the voltage associated with the energy storage device 260 is greater than the threshold voltage.

In some implementations, the threshold voltage can correspond to a rated voltage associated with the rechargeable battery 116. For instance, in some implementations, the rated voltage of the rechargeable battery 116 can range from about 1.2 Volts to about 3 Volts. It should be understood that the solid state switch 270 can decouple the energy storage device 260 from the rechargeable battery 116 after the energy storage device 260 has transferred enough charge such that the voltage associated with the energy storage device 260 is no longer greater than the threshold voltage. In this manner, the energy storage device 260 can be prevented from transferring all of its charge to the rechargeable battery.

It should be understood that the solid state switch 270 can include any suitable type of electronic power switch. In some implementations, the solid state switch 270 can be a silicon controlled rectifier. It should be understood, however, that the solid state switch 270) can include any suitable type of solid state switch. For instance, in some implementations, the solid state switch 270 can include a metal oxide silicon field effect transistor (MOSFET). In alternative implementations, the solid state switch 270 can include a bipolar junction transistor (BJT).

In some implementations, the charging system 200 can include a current protection circuit 280 coupled between the rechargeable battery 116 and the solid state switch 270. The current protection circuit 280 can be configured to regulate a direct current 290 (e.g. limit the direct current or keep the direct current within a specified range) associated with the charge being transferred from the energy storage device 260 to the rechargeable battery 116. In this manner, the rechargeable battery 116 can be protected against an overcurrent condition that may occur when transferring charge from the energy storage device 260 to the rechargeable battery 116.

Figure 7:
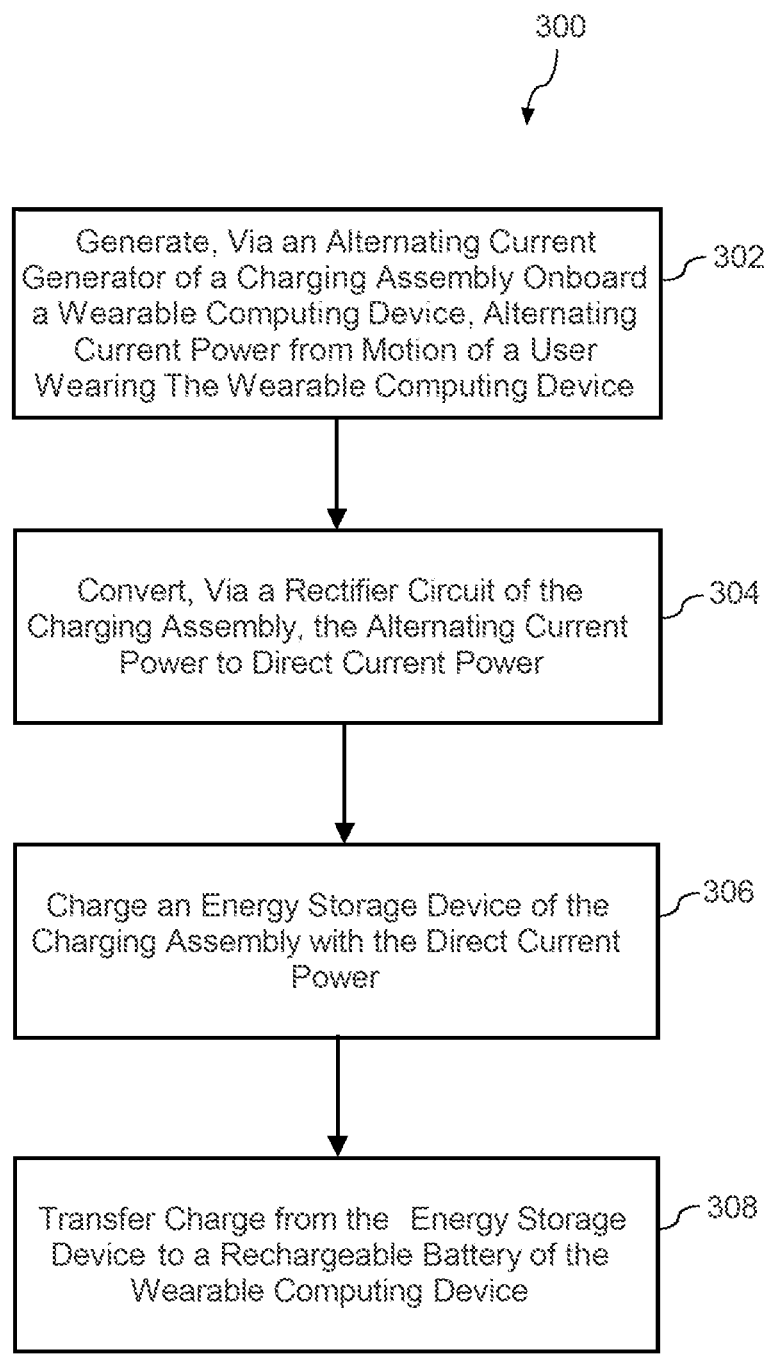
FIG. 7 depicts a flow diagram of a method of charging a rechargeable battery according to some implementations of the present disclosure.

Referring now to FIG. 7, a flow diagram of an example method 300 of charging a rechargeable battery of a wearable computing device is provided according to some implementations of the present disclosure. The method 300 may be implemented using, for instance, the charging system 200 discussed above with reference to FIGS. 3-6. FIG. 7 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously, or modified in various ways without deviating from the scope of the present disclosure.

At (302), the method 300 can include generating, by an alternating current generator of the charging system, alternating current power from motion of the user wearing the wearable computing device. For instance, in some implementations, generating the alternating current power can include generating a plurality of alternating current voltage impulses due to motion of the user wearing the wearable computing device. For instance, a first alternating current voltage impulse can be induced on a first coil associated with a first pole of a plurality of poles of a stator of the alternating current generator. Furthermore, a second alternating current voltage impulse can be induced on a second coil associated with a second pole of the plurality of poles due, at least in part, to a change in a second magnetic flux between the second pole and the rotor from the rotational motion of the rotor.

It should be understood that the first alternating current voltage impulse is generated based on a change in a first magnetic flux between the first pole and a rotor of the alternating current generator that rotates relative to the plurality of poles due, in part, to motion of the user wearing the wearable computing device. It should also be understood that the second alternating current voltage impulse is generated based on a change in a second magnetic flux between the second pole and the rotor of the alternating current generator.

At (304), the method 300 can include converting, via a rectifier circuit of the charging system, the alternating current power generated at (302) to direct current power. For instance, in some implementations, the rectifier circuit can include a half-wave or full-wave rectifier circuit configured to convert the alternating current power to the direct current power. Furthermore, in some implementations, the rectifier circuit can be electrically coupled to each of the plurality of coils of the stator of the alternating current generator such that an alternating current associated with each of the plurality of alternating current voltage impulses flows in the same direction (that is, from the corresponding coil to the rectifier circuit).

At (306), the method 300 can include charging an energy storage device with the direct current power output by the rectifier circuit. The energy storage device can have a power density that is greater than a power density of the rechargeable battery. In this manner, the energy storage device can store the bursts of energy (e.g., impulse voltages) output by the alternating current generator at (302) due to motion of the user wearing the wearable computing device. For instance, in some implementations, the energy storage device can be a supercapacitor.

At (308), the method 300 can include transferring charge stored in the energy storage device to the rechargeable battery. In this manner, the rechargeable battery can be charged without having to be coupled to an external power source (e.g., wall outlet) via a charging cable.

Figure 8:
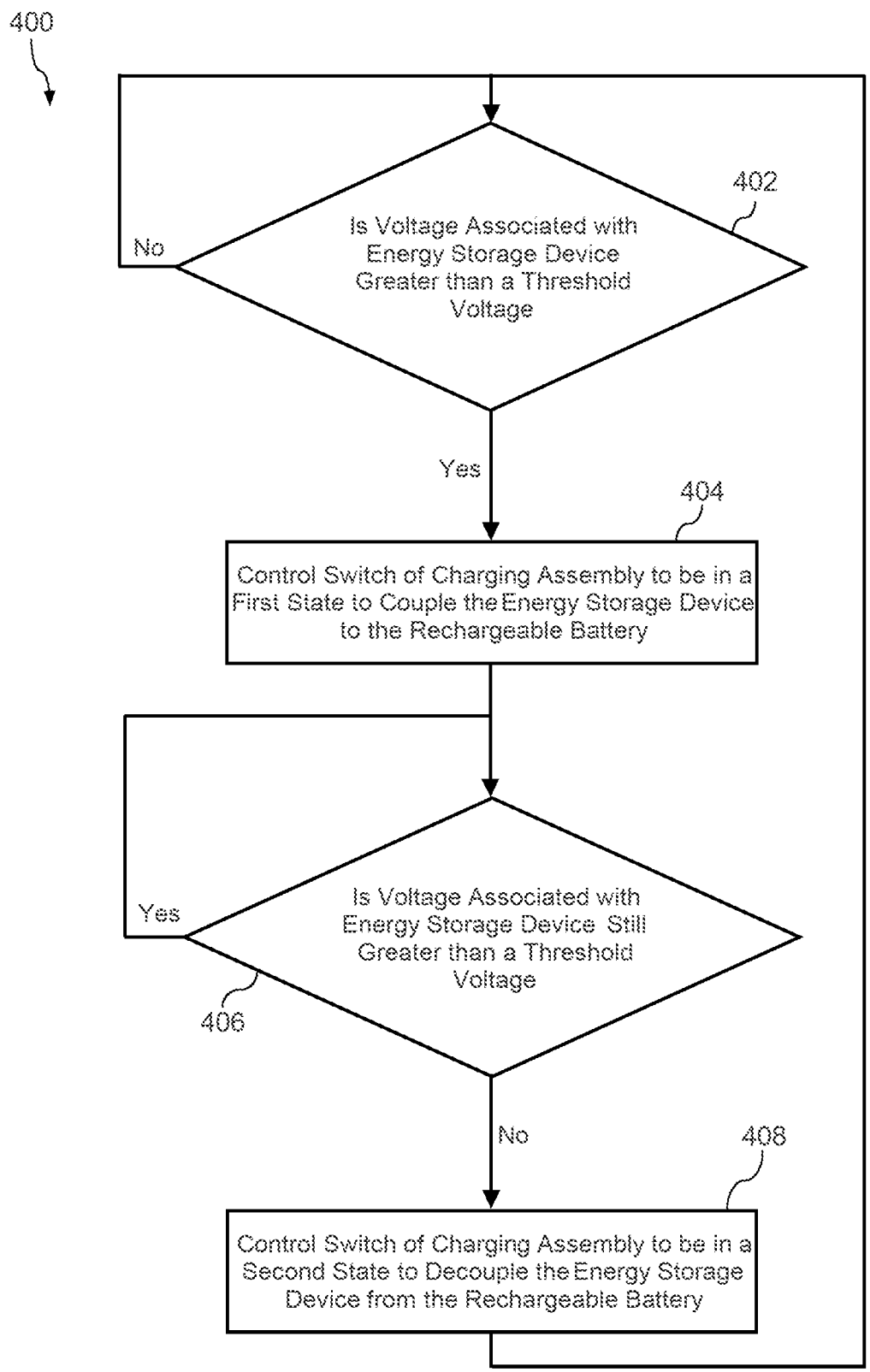
FIG. 8 depicts a flow diagram of a method of transferring charge from an energy storage device of a charging system to a rechargeable battery of a wearable computing device according to some implementations of the present disclosure.

Referring now to FIG. 8, a flow diagram of a method 400 of transferring charge from an energy storage device of a charging system to a rechargeable battery of a wearable computing device is provided according to some implementations of the present disclosure. The method 400 may be implemented using, for instance, the charging system 200 discussed above with reference to FIGS. 3-6. FIG. 8 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

At (402), the method 400 can include determining whether a voltage associated with the energy storage device is greater than a threshold voltage. In some implementations, the threshold voltage can correspond to a rated voltage of the rechargeable battery. For instance, the threshold voltage can range from about 1.2 Volts to about 3 Volts. When the voltage associated with the energy storage device is greater than the threshold voltage, the method 400 proceeds to (404). Otherwise, the method 400 ends or, alternatively, remains at (402) and continues to check the voltage associated with the energy storage device against the threshold voltage.

At (404), the method 400 can include controlling operation of a solid state switch of the charging assembly to be in a first state to couple the energy storage device to the rechargeable battery. In this manner, charge stored in the energy storage device can be transferred to the rechargeable battery to facilitate charging of the rechargeable battery.

At (406), the method 400 can include determining whether the voltage associated with the energy storage device is still greater than the threshold voltage a period of time after coupling the energy storage device to the rechargeable battery via the solid state switch at (404). If it is determined at (404) that the voltage associated with the energy storage device is still greater than the threshold voltage, the method 400 remains at (404). Conversely, the method 400 proceeds to (408) when it is determined at (404) that the voltage associated with the energy storage device is no longer greater than the threshold voltage.

At (408), the method 400 can include controlling operation of the solid state switch of the charging assembly to be in a second state to decouple the energy storage device from the rechargeable battery. In this manner, the energy storage device can no longer transfer charge to the rechargeable battery when the solid state switch is configured in the second state. In some implementations, the method 400 reverts to (402) after controlling operation of the solid state switch to decouple the energy storage device from the rechargeable battery to cease (e.g., stop) charging of the rechargeable battery.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device comprising:
a housing defining a cavity;
a rechargeable battery disposed within the cavity; and
a charging system disposed within the cavity, the charging system comprising:
an alternating current generator configured to generate alternating current power, the alternating current generator comprising a stator and a rotor, the stator comprising a plurality of poles arranged in an annular configuration about an interior circumferential portion of the housing, the rotor rotatable relative to the stator due to motion of a user wearing the wearable computing device;
a rectifier circuit electrically coupled to the stator of the alternating current generator, the rectifier circuit configured to convert the alternating current power to direct current power;
an energy storage device electrically coupled to the rectifier circuit such that the energy storage device is charged with the direct current power; and
a solid state switch coupled between the energy storage device and the rechargeable battery, the solid state switch configured to selectively couple the energy storage device to the rechargeable battery to transfer charge from the energy storage device to the rechargeable battery, wherein
each of the plurality of poles include a coil which is wrapped around a corresponding pole among the plurality of poles,
the rotor includes an arm configured to rotate about a center of the housing, and a magnet that is disposed at a distal end of the arm and which is spaced apart from the plurality of poles in a radial direction of the arm, the radial direction extending from the center of the housing toward the distal end of the arm, and
when a voltage across the energy storage device is less than a rated voltage of the rechargeable battery, the solid state switch is configured in a first state such that the energy storage device is decoupled from the rechargeable battery.

2. The wearable computing device of claim 1, wherein the energy storage device comprises a supercapacitor.

3. The wearable computing device of claim 1, wherein:
when a voltage across the energy storage device is greater than the rated voltage of the rechargeable battery, the solid state switch is configured in a second state such that the energy storage device is coupled to the rechargeable battery.

4. The wearable computing device of claim 1, wherein the arm is rotatable about the center of the housing relative to the stator based on the motion of the user wearing the wearable computing device.

5. The wearable computing device of claim 1, wherein the plurality of poles comprises an even number of poles.

6. The wearable computing device of claim 5, wherein the plurality of poles comprise a total of twelve poles, and wherein each of the twelve poles are arranged in the annular configuration.

7. The wearable computing device of claim 1, wherein
the rectifier circuit includes a half-wave rectifier or a full-wave rectifier.

8. The wearable computing device of claim 1, wherein
the stator comprises a plurality of coils, each of the coils associated with a corresponding pole of the plurality of poles, and
the rectifier circuit is electrically coupled between a first terminal of a corresponding coil among the plurality of coils and a second terminal of the corresponding coil.

9. The wearable computing device of claim 8, wherein the rectifier circuit is electrically coupled to each of the plurality of coils such that an alternating current associated with the alternating current power flows is unidirectional.

10. The wearable computing device of claim 1, wherein the rated voltage is a voltage between about 1.2 volts to about 3 volts.

11. The wearable computing device of claim 1, further comprising:
a current protection circuit coupled between the solid state switch and the rechargeable battery, the current protection circuit configured to limit a current associated with the charge being transferred from the energy storage device to the rechargeable battery.

12. The wearable computing device of claim 1, wherein the solid state switch comprises a silicon controlled rectifier.

13. The wearable computing device of claim 1, wherein the plurality of poles comprises an odd number of poles.

14. A method of charging a rechargeable battery of a wearable computing device, the method comprising:
generating, via an alternating current generator of a charging system for the wearable computing device, alternating current power from motion of the wearable computing device, wherein the alternating current generator comprises a stator and a rotor, the stator comprising a plurality of poles arranged in an annular configuration about an interior circumferential portion of a housing of the wearable computing device, each of the plurality of poles include a coil wrapped around a corresponding pole among the plurality of poles, and the rotor includes an arm configured to rotate about a center of the housing and a magnet that is disposed at a distal end of the arm and which is spaced apart from the plurality of poles in a radial direction of the arm, the radial direction extending from the center of the housing toward the distal end of the arm;
converting, via a rectifier circuit of the charging system, the alternating current power to direct current power;
charging an energy storage device of the charging system with the direct current power;
when a voltage across the energy storage device is more than a rated voltage of the rechargeable battery, configuring a solid state switch, disposed between the energy storage device and the rechargeable battery, in a first state, and transferring charge from the energy storage device to the rechargeable battery; and
when a voltage across the energy storage device is less than the rated voltage of the rechargeable battery, configuring the solid state switch in a second state to decouple the energy storage device from the rechargeable battery.

15. The method of claim 14, wherein generating alternating current power from motion of the wearable computing device comprises:
generating a first alternating current voltage impulse on a first coil associated with a first pole of the plurality of poles of the stator of the alternating current generator due, at least in part, to a change in a first magnetic flux between the first pole and the rotor of the alternating current generator from rotational motion on the rotor due, at least in part, to the motion of the wearable computing device; and
generating a second alternating current voltage impulse on a second coil associated with a second pole of the plurality of poles due, at least in part, to a change in a second magnetic flux between the second pole and the rotor from the rotational motion of the rotor.

16. The method of claim 15, wherein:
the change in the first magnetic flux comprises a decrease in the first magnetic flux; and
the change in the second magnetic flux comprises an increase in the second magnetic flux.

17. The method of claim 14, wherein the rated voltage is a voltage between about 1.2 volts to about 3 volts.

18. The method of claim 14, further comprising limiting, by a current protection circuit disposed between the solid state switch and the rechargeable battery, a current associated with the charge being transferred from the energy storage device to the rechargeable battery.

19. The method of claim 14, wherein the energy storage device comprises a supercapacitor.

* * * * *